(12) United States Patent
Gates et al.

(10) Patent No.: US 12,500,623 B2
(45) Date of Patent: Dec. 16, 2025

(54) PROTECTIVE CASE FOR FOLDING ELECTRONIC DEVICE

(71) Applicant: Otter Products, LLC, Fort Collins, CO (US)

(72) Inventors: Lee B. Gates, Fort Collins, CO (US); Jason Sagen, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 326 days.

(21) Appl. No.: 18/210,692

(22) Filed: Jun. 16, 2023

(65) Prior Publication Data

US 2024/0007140 A1    Jan. 4, 2024

Related U.S. Application Data

(60) Provisional application No. 63/357,299, filed on Jun. 30, 2022.

(51) Int. Cl.
| | |
|---|---|
| *H04M 1/04* | (2006.01) |
| *A45C 11/00* | (2006.01) |
| *G06F 1/16* | (2006.01) |
| *H04B 1/3888* | (2015.01) |
| *H04M 1/02* | (2006.01) |

(52) U.S. Cl.
CPC ............ *H04B 1/3888* (2013.01); *A45C 11/00* (2013.01); *A45C 11/002* (2025.01); *A45C 11/003* (2025.01); *H04M 1/0216* (2013.01)

(58) Field of Classification Search
CPC ..... H04B 1/3888; A45C 11/00; A45C 11/002; A45C 11/003; H04M 1/0216; H04M 1/0214; H04M 1/185
See application file for complete search history.

(56) References Cited

U.S. PATENT DOCUMENTS

| | | | |
|---|---|---|---|
| 4,984,706 | A | 1/1991 | Cadwell et al. |
| 5,632,373 | A | 5/1997 | Kumar et al. |
| 5,966,647 | A | 10/1999 | Sawai |
| 6,109,434 | A | 8/2000 | Howard, Jr. |
| 6,267,236 | B1 | 7/2001 | Seok |

(Continued)

FOREIGN PATENT DOCUMENTS

| | | |
|---|---|---|
| GB | 2521152 A | 6/2015 |
| WO | 1994000037 A1 | 1/1994 |

(Continued)

*Primary Examiner* — Alison Slater

(57) ABSTRACT

A protective case for a foldable electronic device. The protective case includes a first member configured for receiving the first portion of the foldable electronic device and a second member configured for receiving the second portion of the foldable electronic device. The first member and the second member are in a plane when the protective case and the foldable electronic device are in the opened position. The protective case also includes a hinge member configured to extend over the hinge portion of the foldable electronic device when the protective case is installed on the foldable electronic device. The hinge member is movably attached to the first member and the second member. The hinge member is configured to move away from the plane in a substantially perpendicular direction when the protective case is transitioned from the closed position to the opened position.

20 Claims, 14 Drawing Sheets

(56) References Cited

U.S. PATENT DOCUMENTS

| | | |
|---|---|---|
| 7,343,184 B2 | 3/2008 | Rostami |
| 7,355,338 B2 | 4/2008 | Osame et al. |
| 7,444,176 B2 | 10/2008 | Oda et al. |
| 7,609,512 B2 | 10/2009 | Richardson et al. |
| 7,850,032 B2 | 12/2010 | Carnevali et al. |
| 7,886,903 B1 | 2/2011 | Wurzelbacher, Jr. et al. |
| 7,933,122 B2 | 4/2011 | Richardson et al. |
| 8,261,933 B2 | 9/2012 | Kidd et al. |
| 8,310,826 B2 | 11/2012 | Wu et al. |
| 8,498,103 B2 | 7/2013 | Graneto, I |
| 8,965,458 B2 | 2/2015 | Richardson et al. |
| 9,025,317 B2 | 5/2015 | Richardson et al. |
| 9,232,674 B2 | 1/2016 | Wang et al. |
| 9,735,595 B2 | 8/2017 | Colahan et al. |
| 10,064,298 B2 | 8/2018 | Cavenagh et al. |
| 10,216,222 B2 | 2/2019 | Fenton et al. |
| 10,314,185 B2 | 6/2019 | Cavenagh et al. |
| 10,585,458 B2 | 3/2020 | Park et al. |
| 10,845,844 B1 | 11/2020 | Chan et al. |
| 10,849,241 B2 | 11/2020 | Cavenagh et al. |
| 10,884,453 B2 | 1/2021 | Armstrong |
| 10,928,854 B1 | 2/2021 | Fenton et al. |
| 11,402,877 B2 | 8/2022 | Sagen et al. |
| 2002/0065054 A1 | 5/2002 | Humphreys et al. |
| 2003/0095374 A1 | 5/2003 | Richardson |
| 2003/0114184 A1 | 6/2003 | Wilson |
| 2004/0180706 A1 | 9/2004 | Pan |
| 2004/0256535 A1 | 12/2004 | Desch |
| 2004/0262179 A1 | 12/2004 | Gartrell et al. |
| 2005/0045505 A1 | 3/2005 | Vandevenne et al. |
| 2005/0139498 A1 | 6/2005 | Goros |
| 2006/0160586 A1 | 7/2006 | Cheng |
| 2006/0175370 A1 | 8/2006 | Arney et al. |
| 2006/0177048 A1 | 8/2006 | Tsutaichi et al. |
| 2006/0198513 A1 | 9/2006 | Eldon |
| 2006/0226040 A1 | 10/2006 | Medina |
| 2007/0201689 A1 | 8/2007 | Uramoto et al. |
| 2007/0205122 A1 | 9/2007 | Oda et al. |
| 2008/0032758 A1 | 2/2008 | Rostami |
| 2008/0053851 A1 | 3/2008 | Ko et al. |
| 2008/0083631 A1 | 4/2008 | Tsang et al. |
| 2008/0121321 A1 | 5/2008 | Tiner et al. |
| 2008/0125197 A1 | 5/2008 | Hongo et al. |
| 2008/0302687 A1 | 12/2008 | Sirichai et al. |
| 2009/0009945 A1 | 1/2009 | Johnson et al. |
| 2009/0032421 A1 | 2/2009 | Sween et al. |
| 2009/0034169 A1 | 2/2009 | Richardson et al. |
| 2009/0050499 A1 | 2/2009 | Calco et al. |
| 2009/0194445 A1 | 8/2009 | Mongan et al. |
| 2009/0211775 A1 | 8/2009 | Yamaguchi et al. |
| 2009/0233658 A1 | 9/2009 | Murayama et al. |
| 2009/0236246 A1 | 9/2009 | Ai |
| 2009/0314400 A1 | 12/2009 | Liu |
| 2010/0096284 A1 | 4/2010 | Bau |
| 2010/0110629 A1 | 5/2010 | Dietz et al. |
| 2010/0122924 A1 | 5/2010 | Andrews |
| 2010/0238119 A1 | 9/2010 | Dubrovsky et al. |
| 2011/0157800 A1 | 6/2011 | Richardson et al. |
| 2011/0228459 A1 | 9/2011 | Richardson et al. |
| 2011/0267757 A1 | 11/2011 | Probst et al. |
| 2012/0043234 A1 | 2/2012 | Westrup |
| 2012/0088557 A1 | 4/2012 | Liang |
| 2012/0154288 A1 | 6/2012 | Walker |
| 2012/0199501 A1 | 8/2012 | Gette et al. |
| 2012/0236484 A1 | 9/2012 | Miyake |
| 2012/0261304 A1 | 10/2012 | Busri |
| 2014/0043737 A1 | 2/2014 | Chen et al. |
| 2014/0262848 A1 | 9/2014 | Fathollahi et al. |
| 2014/0262875 A1 | 9/2014 | Carnevali |
| 2014/0263939 A1 | 9/2014 | Rinner |
| 2015/0031223 A1 | 1/2015 | Liao |
| 2015/0156297 A1 | 6/2015 | Crawford et al. |
| 2015/0257285 A1 | 9/2015 | Wilson et al. |
| 2015/0296942 A1 | 10/2015 | Sirichai |
| 2016/0139635 A1 | 5/2016 | Gibson et al. |
| 2016/0162112 A1 | 6/2016 | Lee et al. |
| 2016/0234951 A1 | 8/2016 | Chen et al. |
| 2016/0299532 A1 | 10/2016 | Gheorghiu et al. |
| 2016/0381014 A1 | 12/2016 | Kim |
| 2017/0054466 A1 | 2/2017 | Flores et al. |
| 2017/0250719 A1 | 8/2017 | Stryker et al. |
| 2017/0257961 A1 | 9/2017 | Chen et al. |
| 2018/0139857 A1* | 5/2018 | Cavenagh ............ H05K 5/0086 |
| 2018/0348817 A1 | 12/2018 | Armstrong |
| 2019/0228208 A1 | 7/2019 | Cho et al. |
| 2020/0267244 A1* | 8/2020 | Kim ..................... G06F 1/1641 |
| 2020/0412401 A1 | 12/2020 | Kim et al. |
| 2021/0244144 A1 | 8/2021 | Cavenagh et al. |
| 2021/0303033 A1 | 9/2021 | Hong et al. |
| 2023/0403347 A1* | 12/2023 | Liu ........................ H04M 1/022 |
| 2025/0013268 A1* | 1/2025 | Zhan ..................... G06F 1/1681 |
| 2025/0071196 A1* | 2/2025 | Lin ..................... H04M 1/0218 |

FOREIGN PATENT DOCUMENTS

| | | |
|---|---|---|
| WO | 1999041958 A1 | 8/1999 |
| WO | 2011067921 A1 | 6/2011 |

* cited by examiner

PROTECTIVE CASE FOR FOLDING ELECTRONIC DEVICE

CROSS REFERENCE TO RELATED APPLICATIONS

This application claims priority to U.S. Provisional Patent Application No. 63/357,299, filed Jun. 30, 2022, which is hereby incorporated by reference in its entirety.

FIELD

This disclosure relates generally to a case or enclosure for protecting a folding electronic device.

BACKGROUND

Mobile telephones, portable computers, and tablet computers are convenient tools that allow people to work, communicate, conduct business, and play games while on the go and away from hardwired Internet connections. These types of electronic devices allow people to communicate via voice, text message, short message service (SMS), instant messaging (IM), and the like. Other such portable devices include computers, personal digital assistants, smartphones, electronic digital readers, electronic game devices, video recorders, cameras, and the like. These types of portable electronic devices are often expensive and contain fragile components that make them susceptible to damage due to dropping, shock, or impact. Protective cases or covers are often used to protect these types of devices. Some newer variations of these devices are foldable and may contain displays on more than one surface. Improved protective cases for foldable electronic devices are desired.

SUMMARY

In one exemplary embodiment, a protective case for a foldable electronic device includes a first member configured for receiving the first portion of the foldable electronic device and a second member configured for receiving the second portion of the foldable electronic device. The first member and the second member are substantially in a single plane when the protective case and the foldable electronic device are in the opened position. The protective case also includes a hinge member configured to extend over the hinge portion of the foldable electronic device when the protective case is installed on the foldable electronic device. The hinge member is movably attached to the first member and the second member. The hinge member is configured to move away from the plane in a substantially or mostly perpendicular direction when the protective case and the installed electronic device are transitioned from the closed position to the opened position.

Other variations and embodiments are possible, including variations and embodiments which do not necessarily include all of the elements described above or below and/or variations and embodiments which may include additional elements.

DETAILED DESCRIPTION

Figure 1:
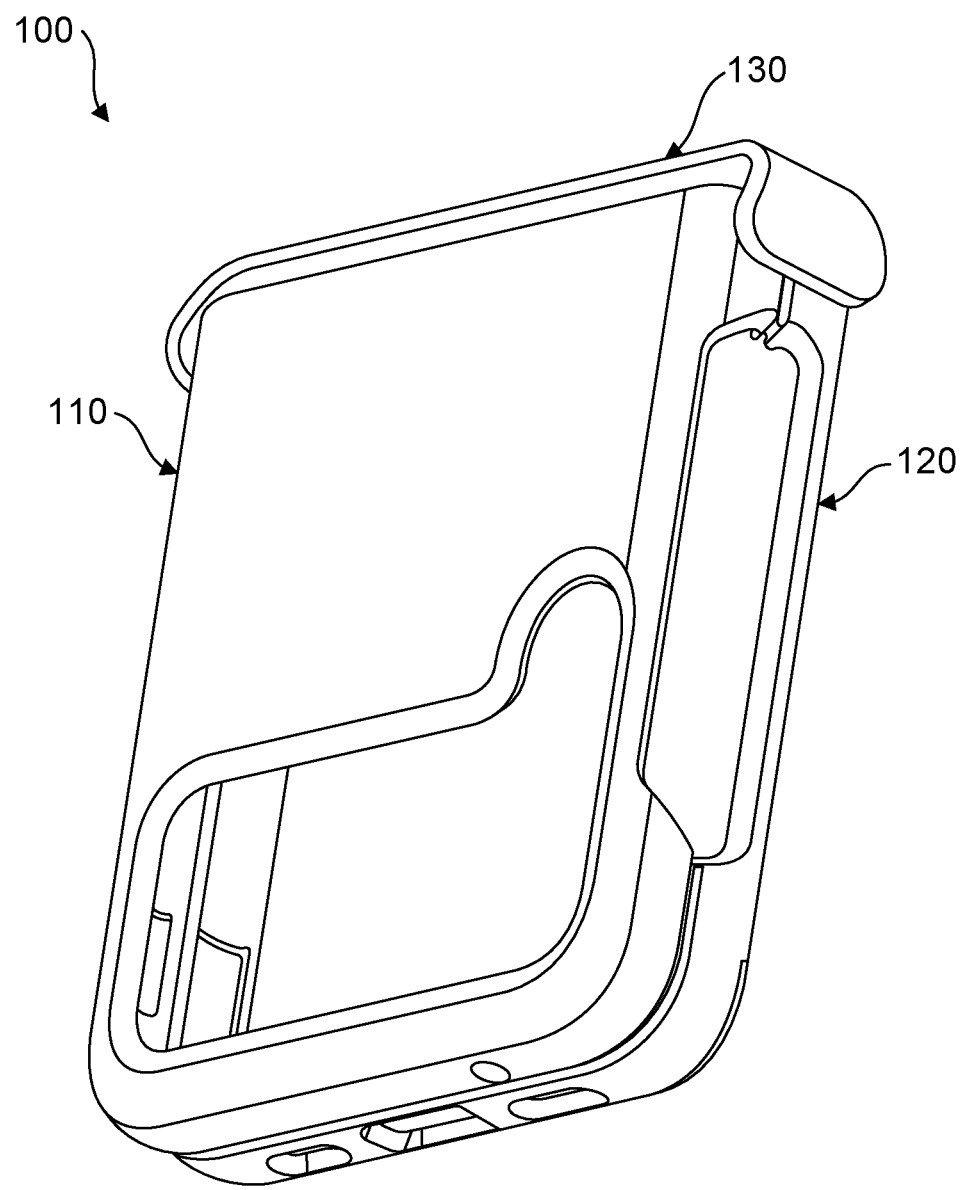
FIG. 1 illustrates a front perspective view of a protective case in a closed position in one embodiment of the invention.

The subject matter described herein relates generally to a housing, case, protective case, cover, enclosure, or protective enclosure, for encasing, or at least partially encasing, an electronic device. It is to be understood that although the singular "device" is used herein, the term encompasses one or more devices. The device or devices may be any electronic device that is capable of being fit within the protective enclosure and/or in need of protecting from one or more adverse environmental conditions, mishandling and/or damage, such as damage from dropping, shock, impact, and/or being contacted by dust or liquid. The protective enclosure or case may be of any appropriate size and dimension so long as it is capable of enclosing, or partially enclosing, the electronic device and protecting it, for instance, from rough treatment and/or adverse conditions. The protective enclosure may be provided as a single piece, or as two or more distinct pieces not directly attached to each other.

The protective enclosure may be a case configured for encasing a device, such as an electronic device, that may be, for example, a mobile telephone device, a mobile computing device, a tablet computer, and/or a smartphone. The electronic device may have one or more screens, such as a touch screen. In some instances, the protective enclosure may fit over at least a portion of an existing housing of the electronic device. In other instances, the protective enclosure is part of a device, such as an electronic device, which encloses or encases various components of the electronic device. For example, the protective enclosure may be the protective enclosure of a mobile device, tablet computer, or other electronic device and may fit over an existing housing of the electronic device.

It is to be understood that although a particular embodiment is presented herein, such as a protective enclosure for encasing the electronic device, such as a smart phone, therein, the device to be housed may be any of a number of different objects or components thereof, as described above, and the protective enclosure may, therefore, have a number of different shapes, sizes, and configurations without departing from the nature of the disclosure. For instance, as depicted herein, the protective case or enclosure may include two separate members, e.g., separate individual top and bottom members, that are configured for being removably coupled together so as to surround an electronic device and thereby encase the electronic device. In certain instances, the top and bottom members may not be separate members, but rather may be members that are joined, for instance, by a common hinge element, or a single member configured for being folded upon itself and thereby forming the protective enclosure. Hence, the scope of the protective enclosures and systems described herein with respect to the particular embodiments set forth in reference to the Figures is not intended to be unduly limiting.

FIG. 1A illustrates a protective case 100 for a foldable electronic device having a first portion that is hingeably attached to a second portion. The electronic device may have a closed position in which the first portion of the electronic device is folded over the second portion like a closed book. The electronic device may also have an opened position in which the first portion is rotated away from the second portion such that the first and second portions are substantially in a same plane similar to an open book or notebook resting on a table. In some examples, the electronic device may also be folded in the opposite direction such that it reaches a second closed position where the back surfaces of the first portion and the second portion are facing each other. The electronic device may have displays on any or all of the surfaces. Any of the displays may be a display screen, an interactive touchscreen, a touchscreen, a touch screen, or a touch-sensitive display. Any of the displays may include foldable or bendable display elements. Any of the displays may span the first and second portions of the device. The first portion and the second portion may have separate display portions that meet or abut when the device is in the opened position.

As illustrated in FIG. 1, protective case 100 may have a first member 110 and second member 120. In FIG. 1, protective case 100 is in the closed position. First member 110 and second member 120 are hingeably or rotatably attached to each other with a hinge member 130. In other examples, more or fewer hinge members 130 may be used. Each of first member 110 and second member 120 may include multiple components and may also include one or more cushioning liners or elements. First member 110 is configured to receive the first portion of the electronic device, while second member 120 is configured to receive the second portion of the electronic device while still allowing the installed electronic device to fold or articulate just as it does when not installed in protective case 100. In some examples, first member 110 and/or second member 120 may slidably receive the respective portion of the electronic device. In other examples, the electronic device may snap into protective case 100 using an interference fit.

Figure 2:
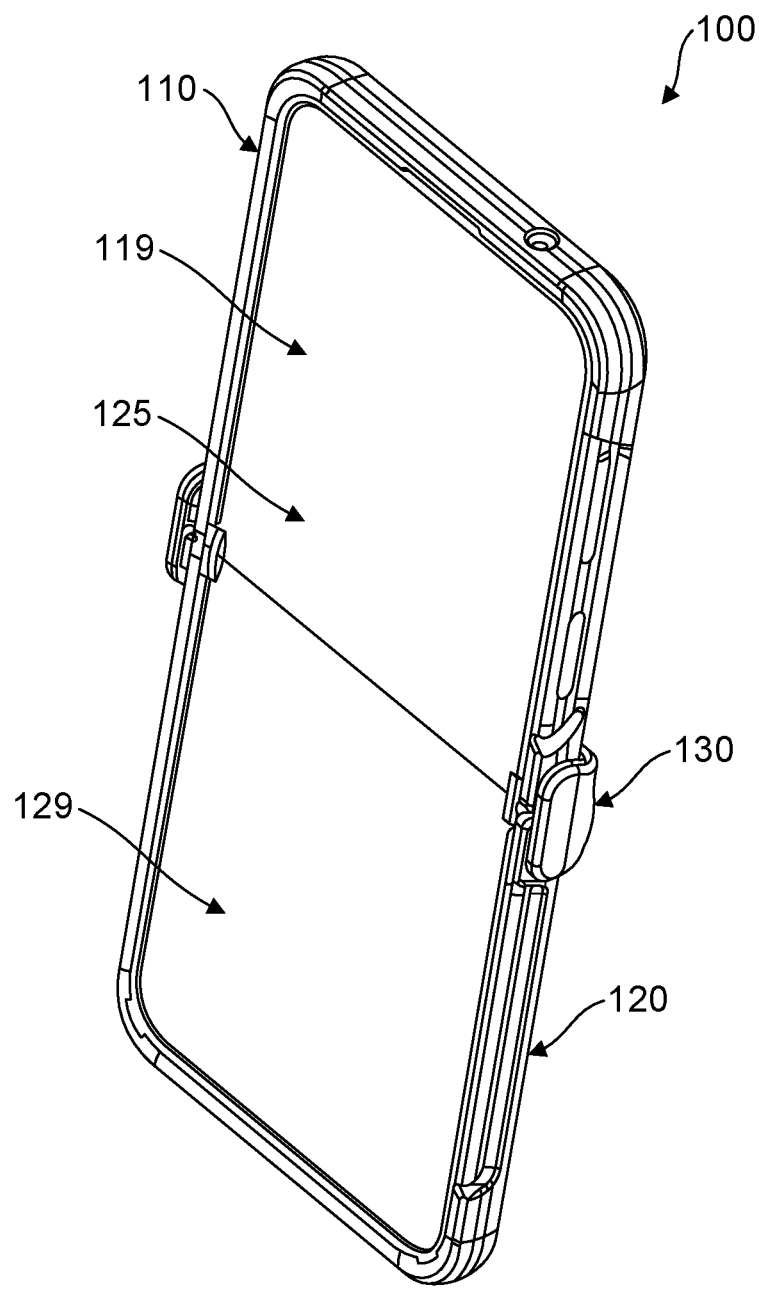
FIG. 2 illustrates the protective case of FIG. 1 in an opened position with a foldable electronic device installed.

FIG. 2 illustrates protective case 100 of FIG. 1 in an opened position with foldable electronic device 125 installed. Foldable electronic device 125 includes a first portion 119 and a second portion 129. First portion 119 is hingeably, rotatably, or movably attached to second portion 129. Any portion of protective case 100 may have ports, openings, or access regions for providing access to a connector, switch, button, or other feature of electronic device 125. Any portion of protective case 100 may also have other features, such as button actuators, for operating or actuating a feature of electronic device 125 from an outside surface of protective case 100. Protective case 100 may also include other features which align with features of electronic device 125 such as a camera opening, a speaker port, a microphone opening, and/or features associated with other sensors or input/output devices of electronic device 125.

When electronic device 125 is installed in protective case 100, both the case and the electronic device may be simultaneously transitioned between a closed position and the opened position illustrated in FIG. 2. First member 110 and second member 120 are configured or adapted such that display portions of first portion 119 and second portion 129 of electronic device 125 are still visible and/or accessible even when installed in protective case 100. Protective case 100 may also include one or more transparent, or substantially transparent, membranes or films that extend over the display portions of electronic device 125 while still permitting the display portions to be visible and/or operated by a user through the membranes or films.

Figure 3:
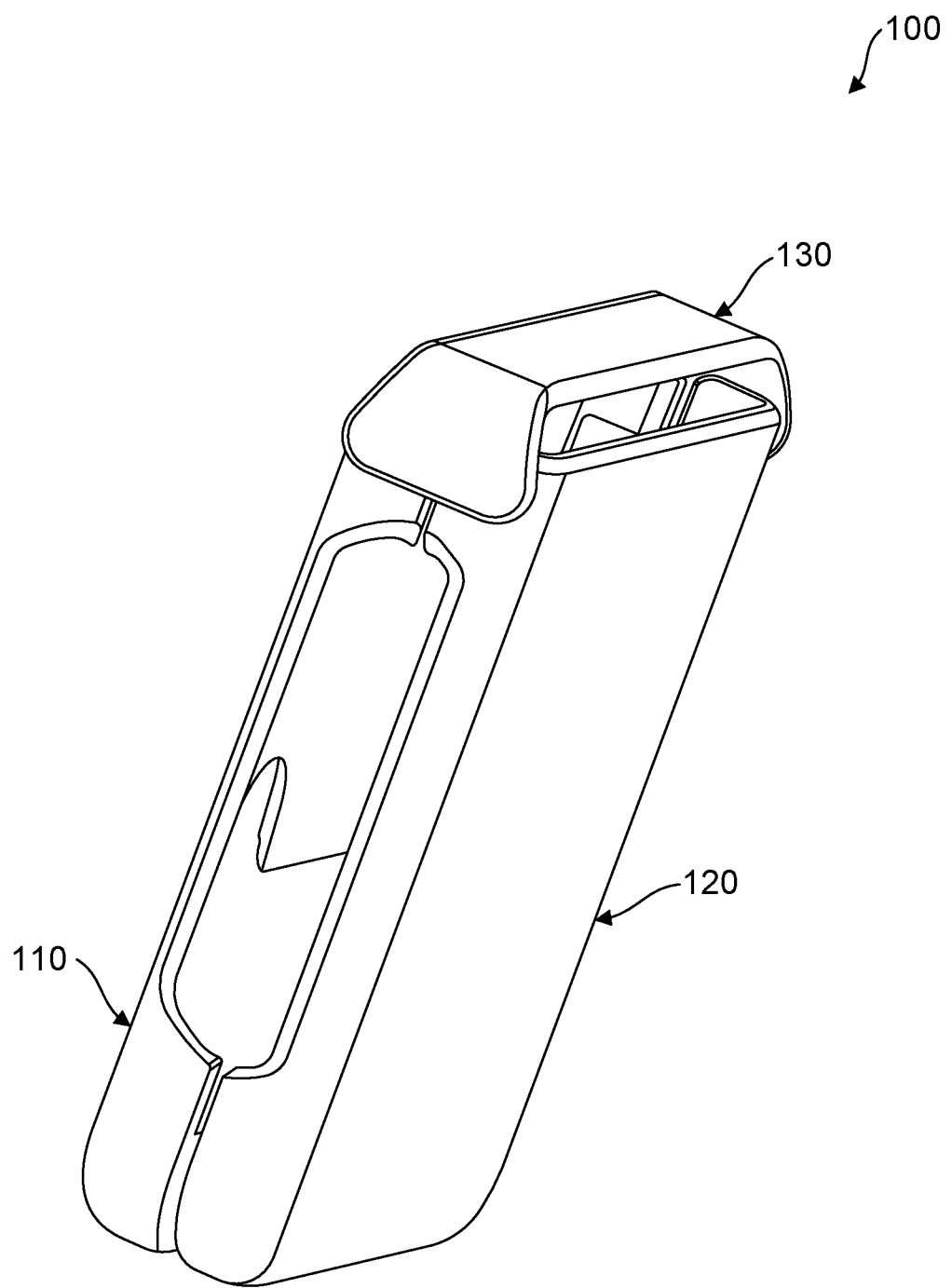
FIG. 3 illustrates a rear perspective view of the protective case of FIG. 1 in the closed position.
Figure 4:
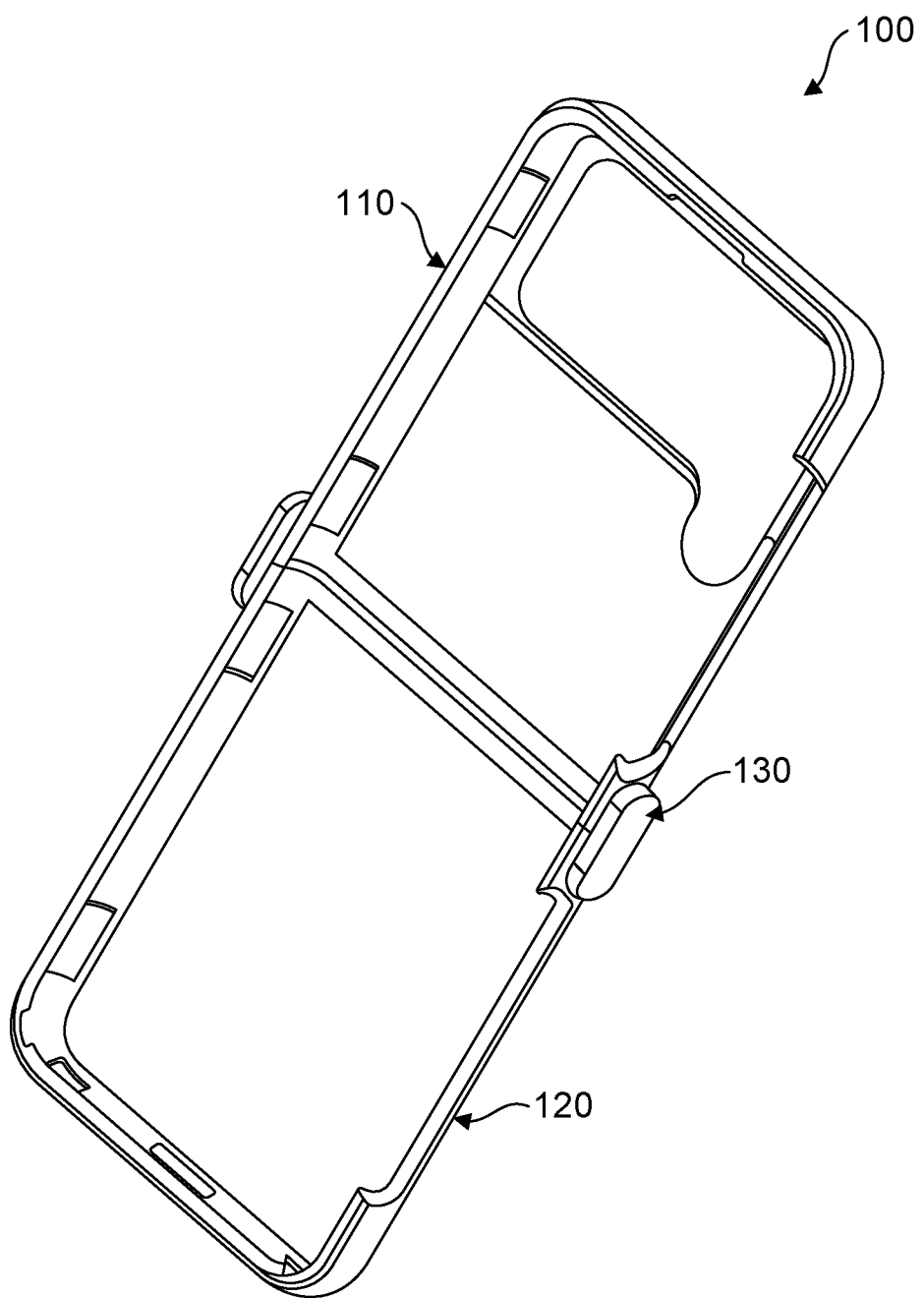
FIG. 4 illustrates the view of FIG. 2 without the foldable electronic device.
Figure 5:
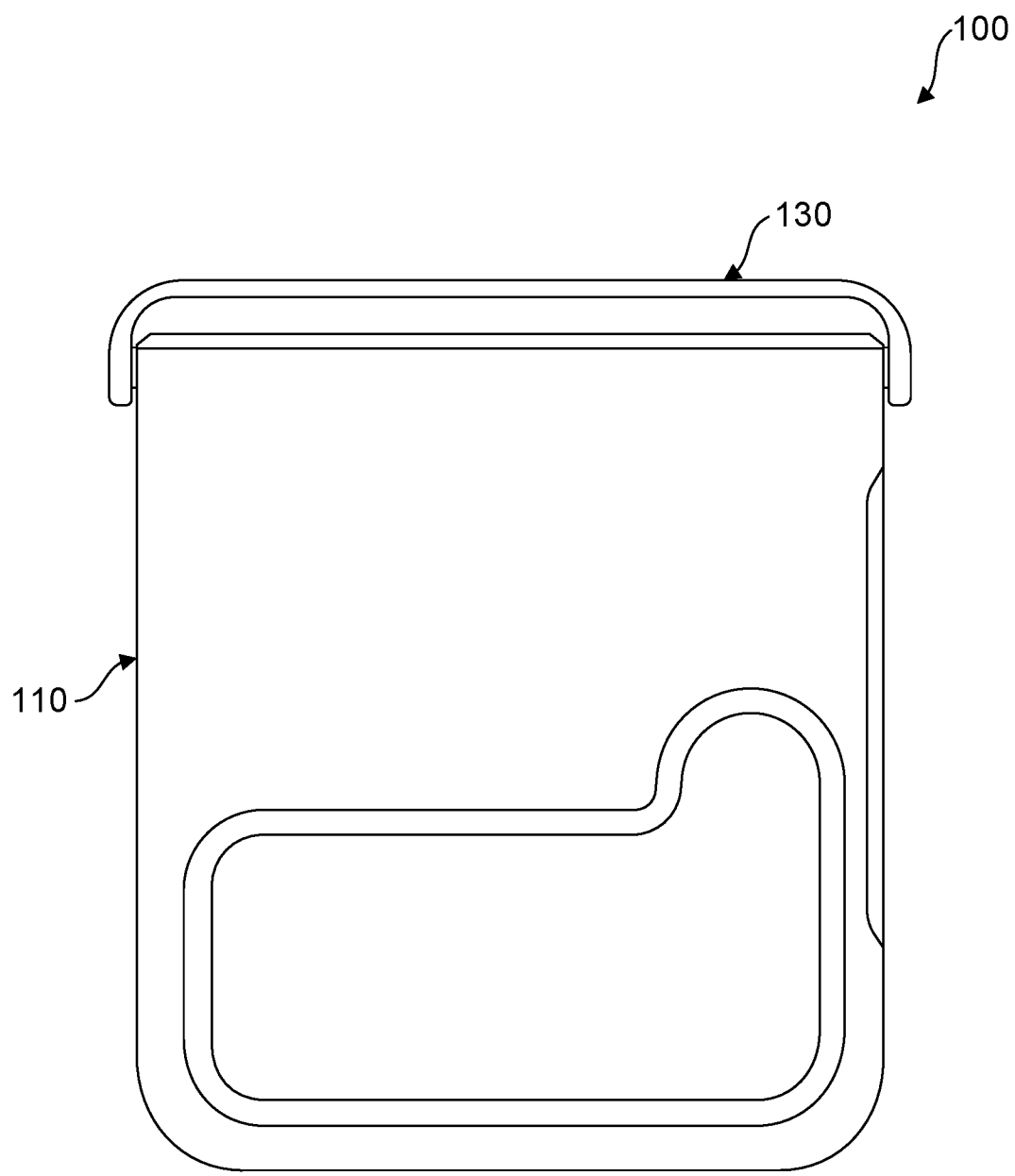
FIG. 5 illustrates a front view of the protective case of FIG. 1 in the closed position.
Figure 6:
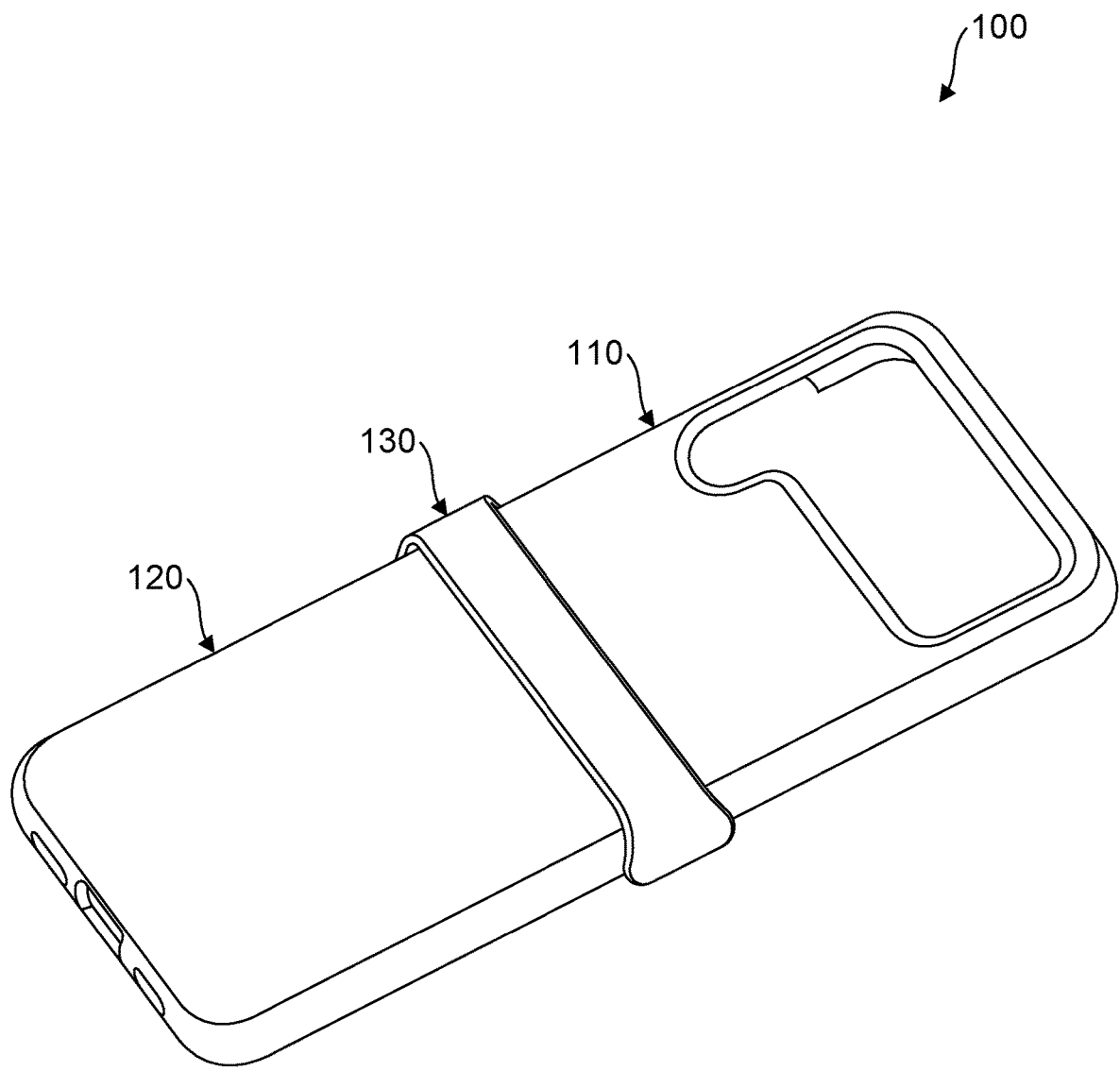
FIG. 6 illustrates a rear perspective view of the protective case of FIG. 1 in the opened position.

FIG. 3 illustrates a rear perspective view of protective case 100 of FIG. 1 in the closed position. FIG. 4 illustrates the view of FIG. 2 without electronic device 125 installed. FIG. 5 illustrates a front view of protective case 100 in the closed position. Both of first member 110 and second member 120 are movably affixed to hinge member 130, directly or indirectly. Hinge member 130 may be removably, semi-permanently, or permanently affixed to first member 110 and/or second member 120. FIG. 6 illustrates a rear perspective view of protective case 100 in the opened position.

Figure 7A:
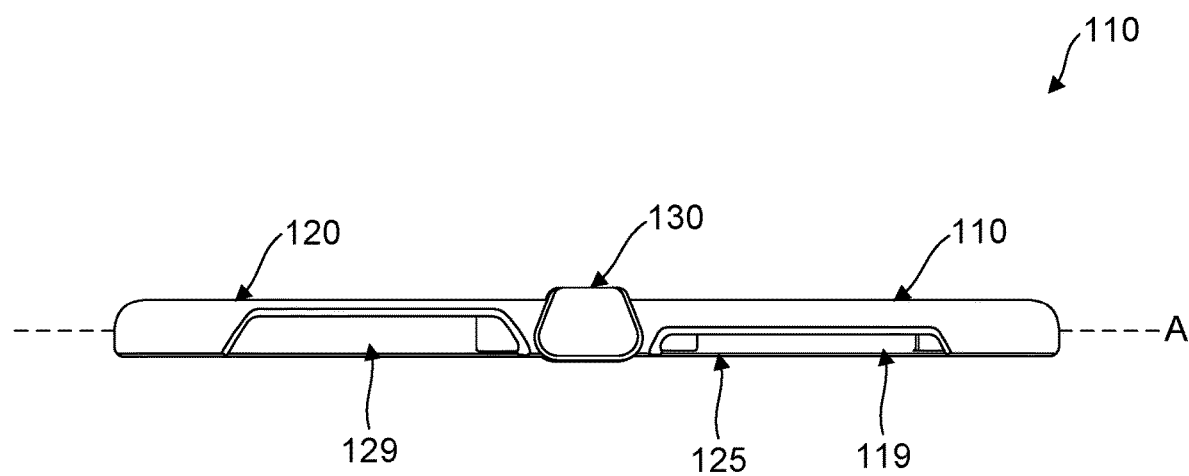
FIG. 7A illustrates a side view of the protective case of FIG. 1 in the opened position.

FIG. 7A illustrates a side view of protective case 100 in the opened position. Electronic device 125, including first portion 119 and second portion 129, is installed in protective case 100. As illustrated, when in the opened position, protective case 100 and electronic device 125 are in a same plane, plane A, or in a substantially same plane. This allows a user to view or use a screen on both portions of electronic device 125 as illustrated in FIG. 2.

Figure 7B:
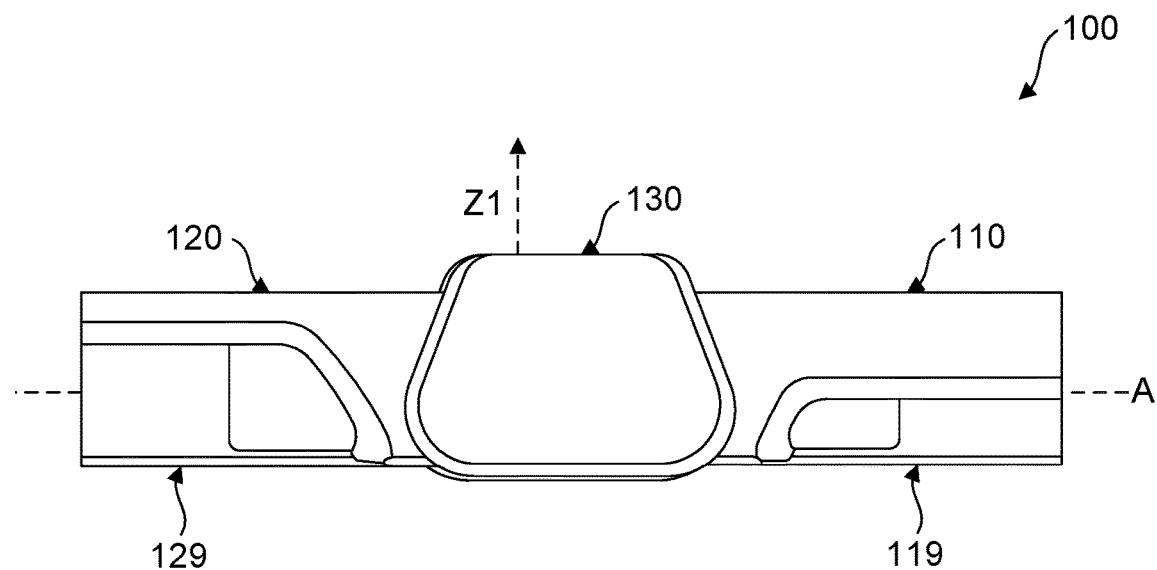
FIG. 7B illustrates a close up view of a portion of the view of FIG. 7A.

FIG. 7B illustrates a close up view of a portion of the view of FIG. 7A. As explained in further detail with respect to subsequent figures, when protective case 100 is transitioned from the closed position (see FIGS. 1, 3, and 5) to the illustrated opened position, hinge member 130 moves upward or away from protective case 100 and/or plane A in a direction indicated by the arrow Z1. The direction of movement may be perpendicular, or substantially perpendicular, to the opened protective case and/or to plane A. This movement of hinge member 130 may be necessary to accommodate or provide space for portion(s) of electronic device 125 which also extend upward further in the Z1 direction when electronic device 125 is in the opened position.

Figure 8:
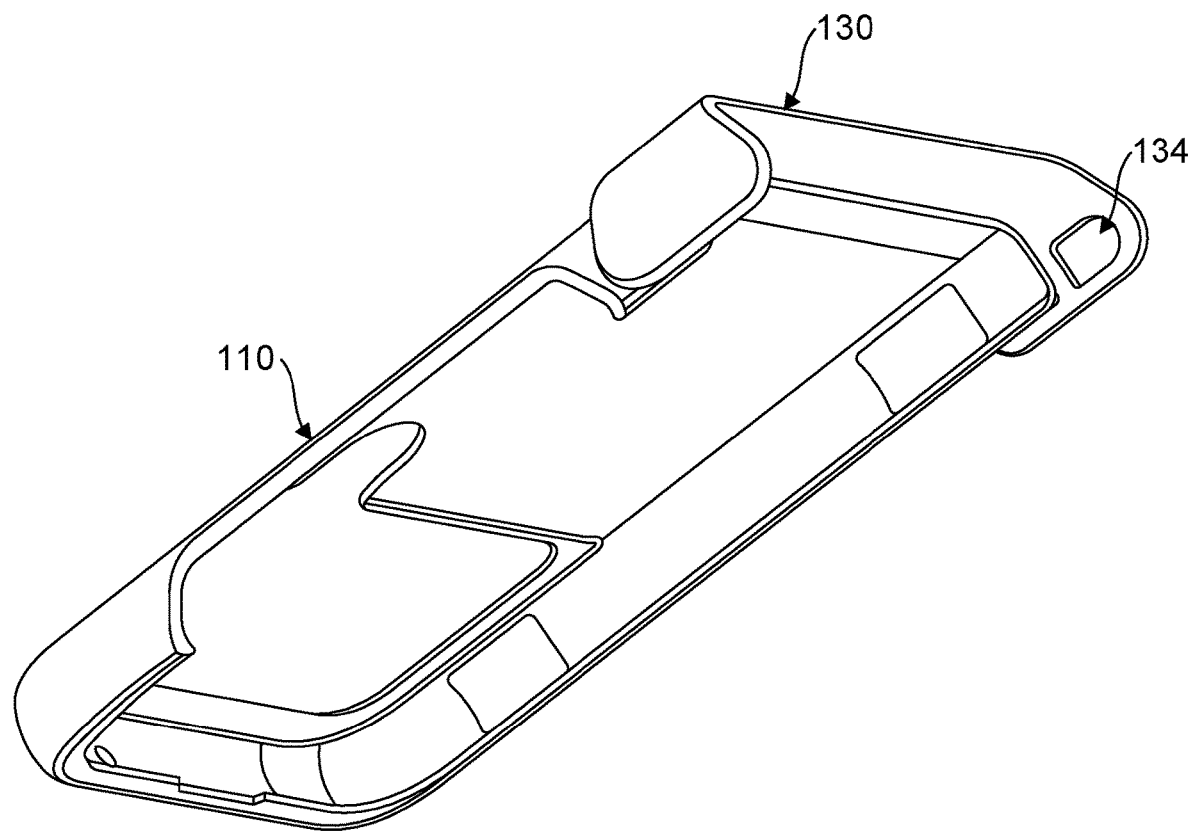
FIG. 8 illustrates a perspective view of a portion of the protective case of FIG. 1.
Figure 9:
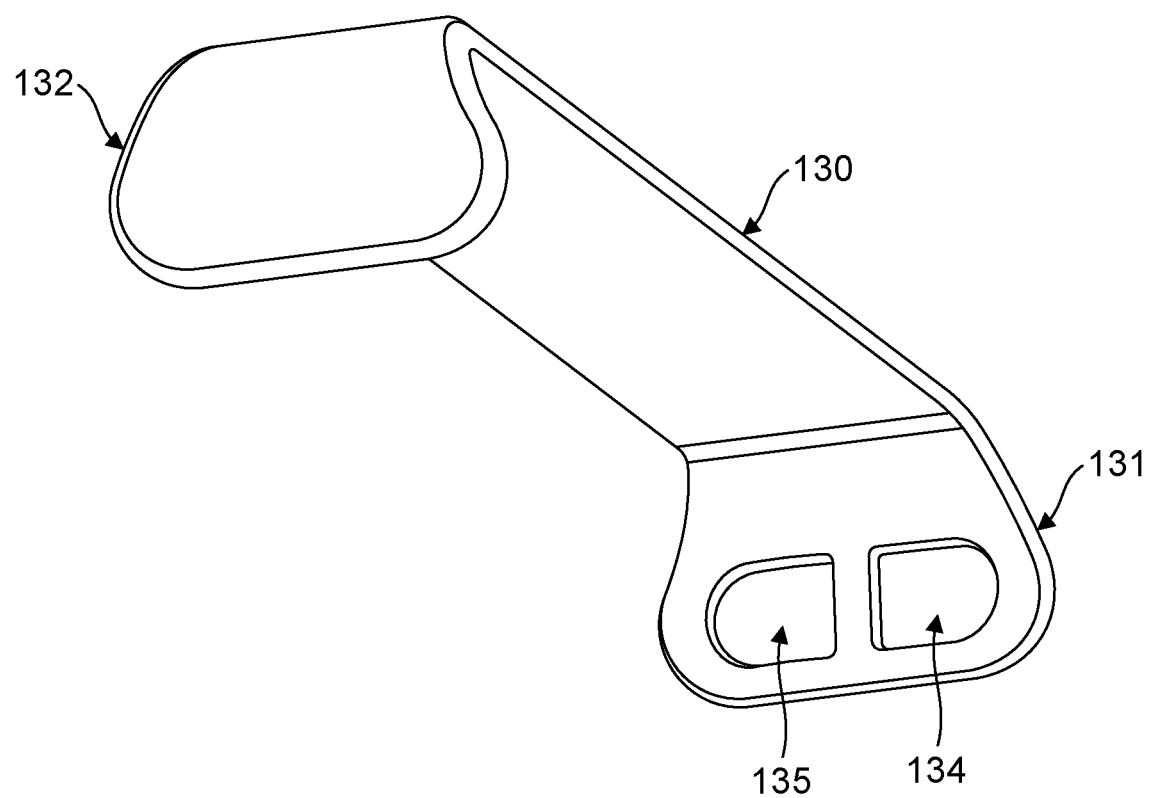
FIG. 9 illustrates a perspective view of a hinge member of the protective case of FIG. 1.

FIG. 8 illustrates a perspective view of a portion of protective case 100. Second member 120 is absent in FIG. 8 exposing a receptacle 134 on an inside surface of one end of hinge member 130. Additional instances of receptacle 134 are present as discussed with respect to subsequent Figures. Receptacle 134 may also be called a receiver, a cavity, a recess, and/or an opening. FIG. 9 illustrates a perspective view of hinge member 130. In FIG. 9, two receptacles are visible on hinge member end 131. The two receptacles have shapes which are a mirror image of each other. There are also two instances of receptacle 134 facing inward on hinge member end 132 which are not visible.

Figure 10A:
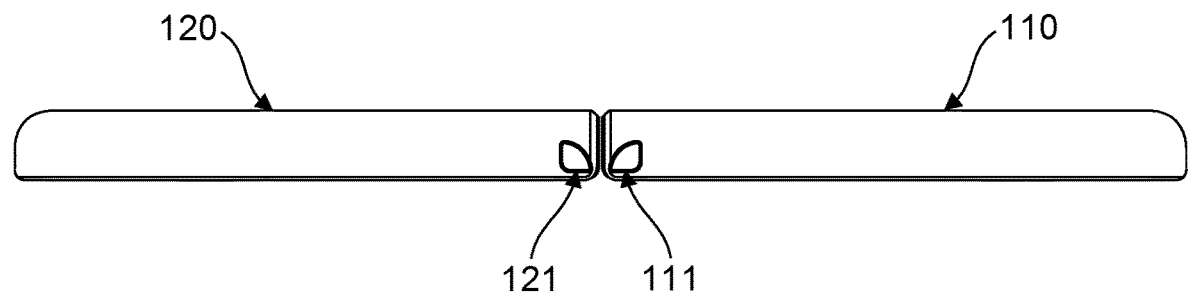
FIG. 10A illustrates a side view of a portion of the protective case of FIG. 1.
Figure 10B:
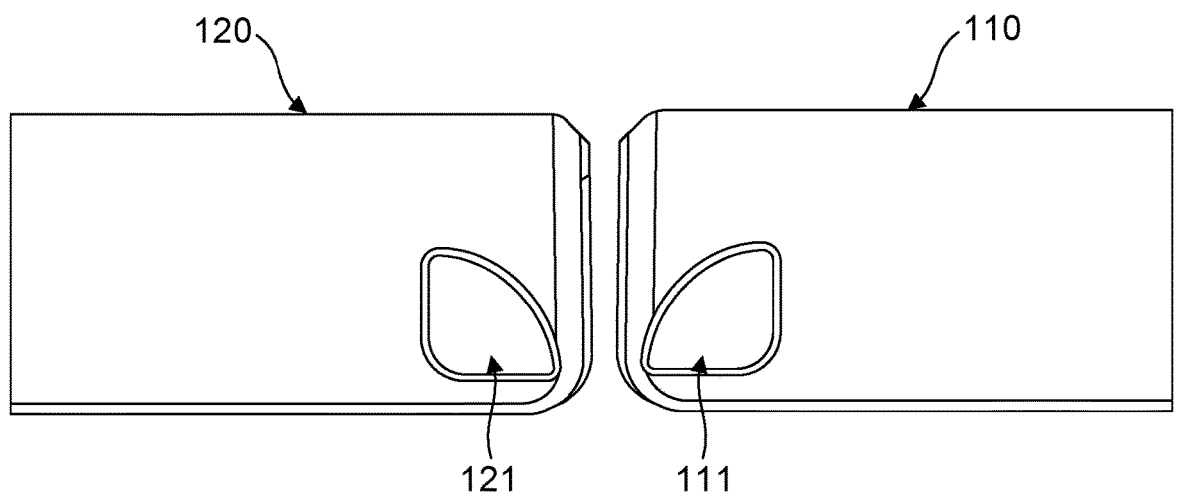
FIG. 10B illustrates a close up view of a portion of the view of FIG. 10A.

FIG. 10A illustrates a side view of a portion of protective case 100 in the opened position. The view of FIG. 10A includes first member 110 and second member 120 and is similar to the view of FIG. 7A with hinge member 130 removed. Cam 111 and cam 121 protrude from side surfaces of first member 110 and second member 120, respectively. Corresponding cams may also be present on opposing sides of first member 110 and second member 120. FIG. 10B illustrates a close up view of a portion of the view of FIG. 10A. Cams 111 and 121 may be separate components which are attached to first and second members 110 and 120 or may be integrally formed as part of first and second members 110 and 120, respectively. As illustrated, cams 111 and 121 may have triangular shapes or curved triangular shapes. Other shapes and positions are possible and other receptacle shapes and positions are possible to achieve the desired relative motions.

Figure 11A:
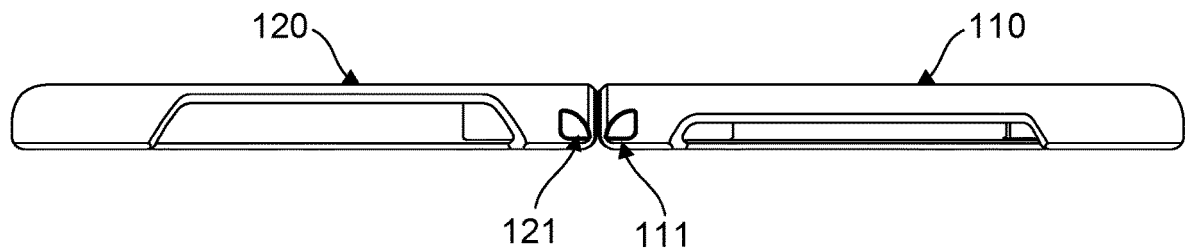
FIG. 11A illustrates a side view of a portion of the protective case of FIG. 1.
Figure 11B:
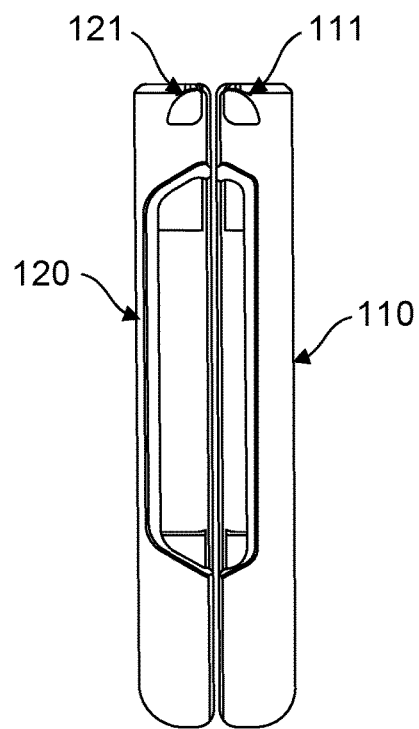
FIG. 11B illustrates a close up view of a portion of the view of FIG. 11A.

FIG. 11A illustrates a side view of a portion of protective case 100 in the opened position. The view of FIG. 11A includes first member 110 and second member 120 and is similar to the view of FIG. 7A with hinge member 130 removed. Cam 111 and cam 121 protrude from side surfaces of first member 110 and second member 120, respectively. Corresponding cams may also be present on opposing sides of first member 110 and second member 120. FIG. 11B illustrates a side view of a portion of protective case 100 in the closed position. As with FIG. 11A, first member 110 and second member 120 are illustrated with hinge member 130 removed to illustrate the rotation of cams 111 and 121 with members 110 and 120, respectively.

Figure 12A:
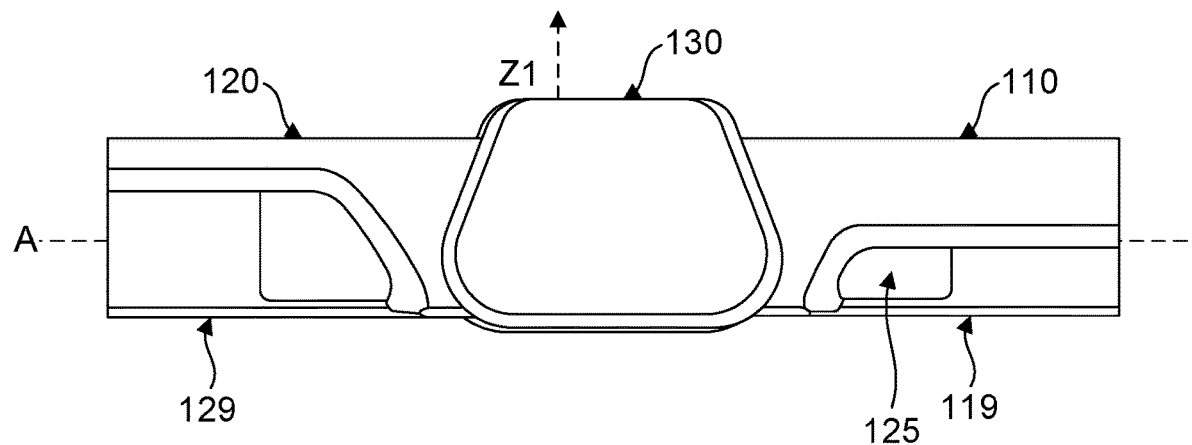
FIG. 12A illustrates a close up side view of a portion of the protective case of FIG. 1.

FIG. 12A illustrates a close up side view of a portion of protective case 100. When protective case 100 is transitioned from the closed position to the illustrated opened position, hinge member 130 moves upward or away from protective case 100 and/or plane A in a direction indicated by the arrow Z1. The direction of movement may be perpendicular, or substantially perpendicular, to the opened protective case and/or to plane A. This may be necessary to accommodate or provide space for portion(s) of electronic device 125 which also extend upward further in the Z1 direction when electronic device 125 is in the opened position. The relative movement or translation of hinge member 130 in the Z1 direction is caused by the rotation of cams 111 and 121 in receptacles 134 and 135. In addition to causing the described movement, the interaction between the cams and the receptacles also allows first member 110 to remain movably and indirectly attached to second member 120 while hinge member 130 provides protection to the hinge portion of electronic device 125. The cams and receptacles may be reversed such that the cams are located on the hinge member and the receptacles are located on the case portions.

Figure 12B:
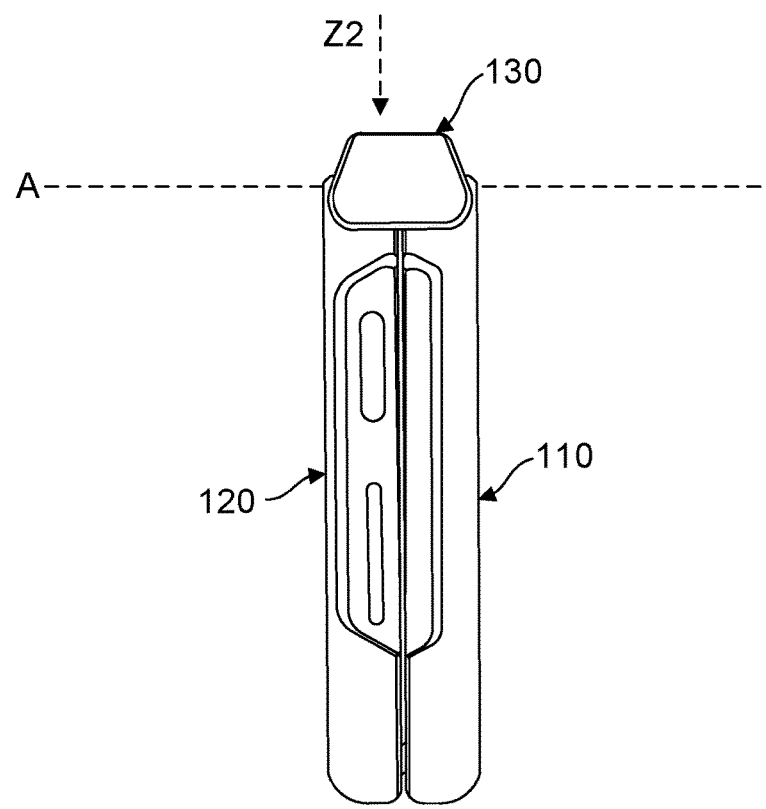
FIG. 12B illustrates a side view of the protective case of FIG. 1.

FIG. 12B illustrates a side view of protective case 100 in the closed position. When protective case 100 transitions from the opened position illustrated in FIG. 12A to the closed position in FIG. 12B, hinge member 130 moves in a direction indicated by the arrow Z2 relative to plane A. The interaction between the cams and the receptacles also allows first member 110 to remain movably and indirectly attached to second member 120 while hinge member 130 provides protection to the hinge portion of electronic device 125.

Figure 13A:
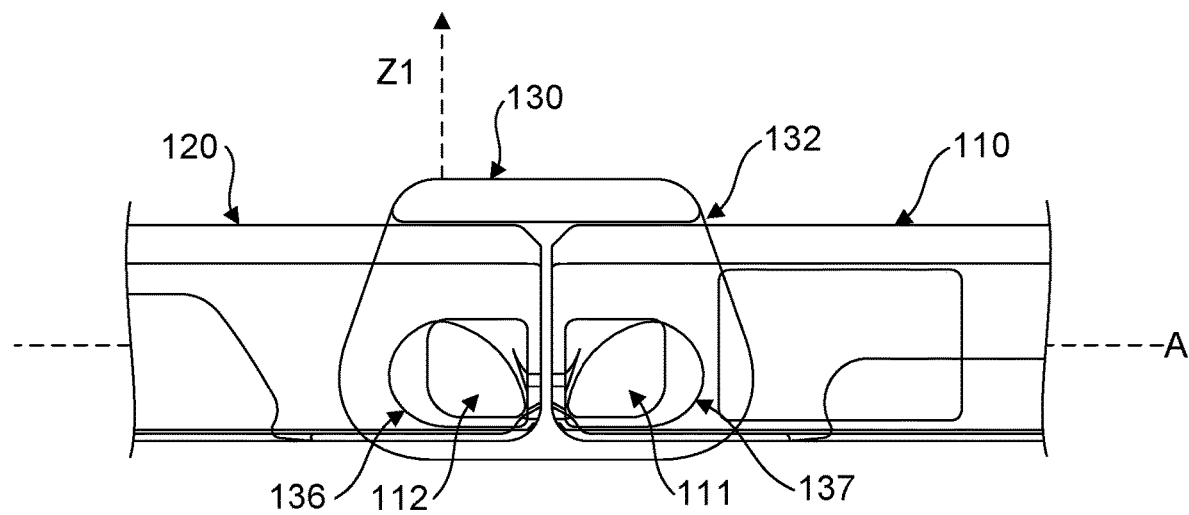
FIG. 13A illustrates a close up side view of a portion of the protective case of FIG. 1 in the opened position.

FIG. 13A illustrates a close up side view of protective case 100 similar to FIG. 12A but presents a transparent view where hidden lines are visible to show internal features. Bridge member 130 includes receptacles 136 and 137 on an inward facing surface of the visible end of bridge member 130. Receptacles 136 and 137 face receptacles 134 and 135 (see FIG. 9) and are configured or adapted to receive cams 136 and 137. When protective case 100 is transitioned from the closed position to the opened position illustrated in FIG. 13A, bridge member 130 moves upward relative to plane A, or away from plane A, in a direction indicated by arrow Z1. This occurs because of the interaction of the shapes of cams 111 and 112 with the shapes of receptacles 136 and 137 when cams 111 and 112 rotate within receptacles 136 and 137.

Figure 13B:
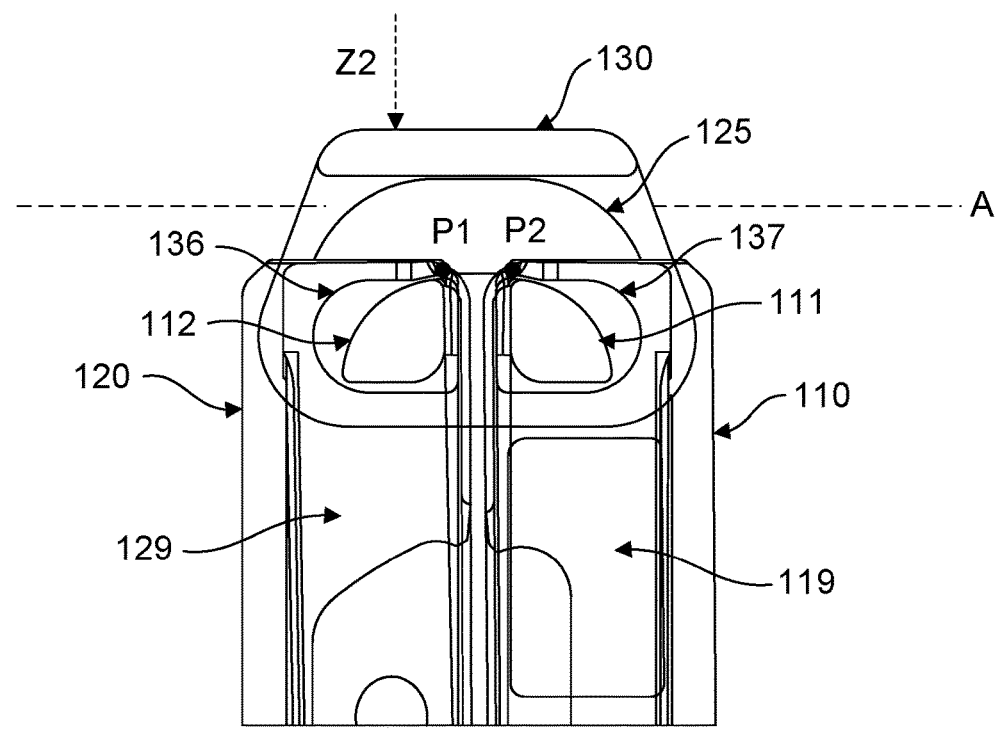
FIG. 13B illustrates a close up side view of a portion of the protective case of FIG. 1 in the closed position.

FIG. 13B illustrates a close up side view of protective case 100 similar to FIG. 12B but presents a transparent view where hidden lines are visible to show internal features. When protective case 100 is transitioned from the opened position of FIG. 13A to the closed position illustrated in FIG. 13B, bridge member 130 moves downward relative to plane A, or toward plane A, in a direction indicated by arrow Z2. This occurs because of the interaction of the shapes of cams 111 and 112 with the shapes of receptacles 136 and 137 when cams 111 and 112 rotate within receptacles 136 and 137. In FIG. 13A, bridge member 130 must raise to the illustrated location in order to provide sufficient space for electronic device 125 and/or first and second members 110 and 120 to fold out flat. In FIG. 13B, less space is needed and bridge member 130 can move down in the Z2 direction as illustrated to save space.

Figure 14:
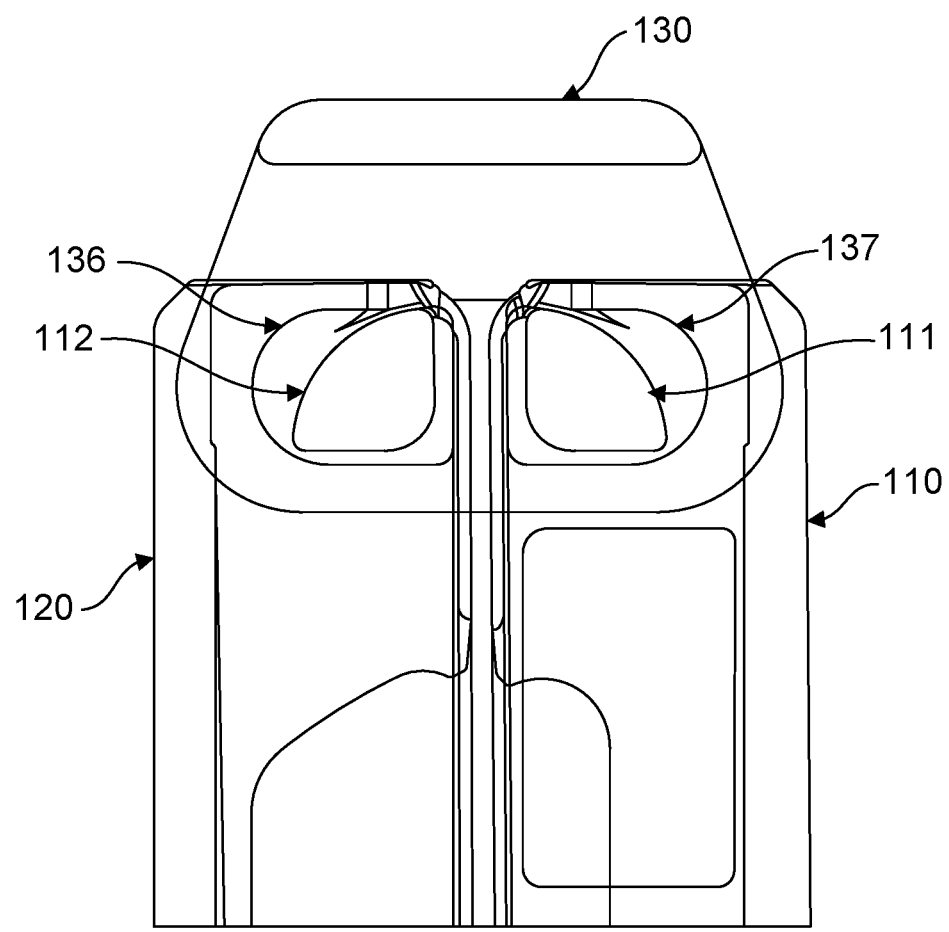
FIG. 14 illustrates a close up side view of a portion of the protective case of FIG. 1 in the closed position.

When transitioning between the open and closed positions, first member 110 and second member 120 may pivot at or near points P2 and P1, respectively. This may be due to the structure of electronic device 125 and its hinge. This causes first member 110 and second member 120 to end up in the relative orientation illustrated in FIG. 13A which may require the movement of hinge 130 in the Z1 direction. The locations of P1 and P2 may vary. FIG. 14 illustrates a view similar to that of FIG. 13B without electronic device 125 installed.

In one example, a protective case 100 for a foldable electronic device 125 has a first portion 119 that is hingeably attached to a second portion 129 with a hinge portion. The foldable electronic device 125 is configured to articulate between a closed position and an opened position. Protective case 100 includes a first member 110 configured for slidably receiving the first portion 119 of foldable electronic device 125. First member 110 has a first cam 111 on a first side of the first member and a second cam on a second side. Protective case 100 also includes a second member 120 configured for slidably receiving the second portion 129 of foldable electronic device 129. Second member 120 has a first cam 112 on a first side of the second member and a second cam on a second side. First member 110 and second member 120 are in plane A when protective case 100 and foldable electronic device 125 are in the opened position. Protective case 100 further includes a hinge member 130 having a plurality of receptacles, such as receptacles 134-137, configured for receiving cams of each of the first member 110 and second member 120 of protective case 100, respectively. Hinge member 130 is configured to extend over the hinge portion of foldable electronic device 125 when protective case 100 is installed on foldable electronic device 125. The cams pivot within the receptacles of hinge member 130 when installed foldable electronic device 125 transitions from the closed position to the opened position to move hinge member 130 away from plane A in a substantially perpendicular direction Z1 when protective case 100 and installed foldable electronic device 125 are transitioned to the opened position.

In another example, first member 110 is adapted or configured for receiving first portion 119 of foldable electronic device 125 while second member 120 is adapted or configured for receiving second portion 120 of foldable electronic device 125. First member 110 and second member 120 are in a plane A when protective case 100 and installed foldable electronic device 125 are in the opened position. Hinge member 130 is configured to extend over the hinge portion of foldable electronic device 125 when protective case 100 is installed on foldable electronic device 100. Hinge member 130 is movably attached to first member 110 and second member 120 such that hinge member 130 moves away from plane A in a substantially perpendicular direction Z1 when protective case 100 is transitioned from the closed position to the opened position.

Any of the apparatuses, techniques, improvements, features, functions, or processes described herein may be implemented in the form of a system or a kit. The system or kit may include any combination of the devices, components, elements, and/or modules disclosed herein.

The elements, components, and steps described herein are meant to exemplify some types of possibilities. In no way should the aforementioned examples limit the scope of the invention, as they are only exemplary embodiments.

The phrases "in some embodiments," "in an exemplary embodiment," "in one exemplary embodiment," "in some exemplary embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A protective case for a foldable electronic device having a first portion that is hingeably attached to a second portion with a hinge portion, the foldable electronic device configured to articulate between a closed position and an opened position, the protective case comprising:
   a first member configured for slidably receiving the first portion of the foldable electronic device, the first member having a first cam on a first side of the first member and a second cam on a second side of the first member opposing the first side;
   a second member configured for slidably receiving the second portion of the foldable electronic device, the second member having a first cam on a first side of the second member and a second cam on a second side of the second member opposing the first side, wherein the first member and the second member are in a plane when the protective case and the foldable electronic device are in the opened position; and
   a hinge member having a plurality of receptacles configured for receiving the first and second cams of each of the first and second members of the protective case, respectively, wherein the hinge member is configured to extend over the hinge portion of the foldable electronic device when the protective case is installed on the foldable electronic device, wherein the cams pivot within the receptacles of the hinge member when the installed foldable electronic device transitions from the closed position to the opened position to move the hinge member away from the plane in a perpendicular direction when the protective case and the installed foldable electronic device are transitioned from the closed position to the opened position.

2. The protective case of claim 1 wherein the cams pivot within the receptacles of the hinge member when the installed foldable electronic device transitions from the opened position to the closed position to move the hinge member toward the plane in a perpendicular direction when the protective case and the installed foldable electronic device are transitioned from the opened position to the closed position.

3. The protective case of claim 1 wherein each of the cams has a triangular shape.

4. The protective case of claim 1 wherein each of the cams has a curved triangular shape.

5. The protective case of claim 1 wherein the hinge member includes a bridge portion, a first end portion at a first end of the bridge portion, and a second end portion at a second end of the bridge portion opposite the first end.

6. The protective case of claim 5 wherein each of the first end portion and the second end portion of the bridge portion includes two of the plurality of the receptacles, respectively.

7. The protective case of claim 1 wherein the hinge member is removable from the first member and the second member.

8. The protective case of claim 1 wherein the first member and the second member are in parallel planes when the protective case is in the closed position.

9. The protective case of claim 1 wherein each of the first portion and the second portion of the foldable electronic device includes a display portion and wherein each of the first member and the second member includes an opening preserving access to the respective display portion when the protective case is installed on the foldable electronic device.

10. A protective cover for a foldable electronic device having a first portion that is hingeably attached to a second portion with a hinge portion, the foldable electronic device articulates between a closed position and an opened position, the protective cover comprising:
   a first member receiving the first portion of the foldable electronic device, the first member having a protruding cam;
   a second member receiving the second portion of the foldable electronic device, the second member having a protruding cam, wherein the first member and the second member are in a single plane when the protective cover and the installed foldable electronic device are in the opened position; and
   a hinge member having a bridge portion and a plurality of cavities each receiving one of the cams, respectively, wherein the bridge portion of the hinge member extends over the hinge portion of the foldable electronic device when the protective cover is installed on the foldable electronic device, wherein the cams pivot within the cavities of the hinge member when the installed foldable electronic device transitions from the closed position to the opened position to move the bridge portion of the hinge member away from the plane when the protective cover and the installed foldable electronic device are transitioned to the opened position.

11. The protective cover of claim 10 wherein the cams pivot within the cavities of the hinge member when the installed foldable electronic device transitions from the opened position to the closed position to move the hinge member toward the plane when the protective case and the installed foldable electronic device are transitioned to the closed position.

12. The protective cover of claim 10 wherein at least one of the first member and the second member includes an aperture providing access to a camera of the installed foldable electronic device.

13. The protective cover of claim 10 wherein each of the first portion and the second portion of the foldable electronic device includes a display portion and wherein each of the first member and the second member includes an opening providing access to the respective display portion when the protective cover is installed on the foldable electronic device.

14. The protective cover of claim 13 further comprising a first transparent membrane extends over the opening of the first member and a second transparent membrane extends over the opening of the second member.

15. The protective cover of claim 10 wherein the hinge member is removable from the first member and the second member.

16. A removable protective case for a foldable electronic device which has a first portion that is attached to a second portion with a hinge portion, the foldable electronic device configured to articulate between a closed position and an opened position, the protective case comprising:

a first member configured for receiving the first portion of the foldable electronic device;
a second member configured for receiving the second portion of the foldable electronic device, wherein the first member and the second member are in a same plane when the protective case and the installed foldable electronic device are in the opened position; and
a hinge member configured to extend over the hinge portion of the foldable electronic device when the protective case is installed on the foldable electronic device, wherein the hinge member is movably attached to the first member and the second member, wherein the hinge member is configured to move away from the plane in a substantially perpendicular direction when the protective case is transitioned from the closed position to the opened position.

17. The removable protective case of claim 16 wherein the foldable electronic device is a smartphone.

18. The removable protective case of claim 16 wherein:
the first member includes a first cam on a first side of the first member and a second cam on a second side of the first member opposite the first side;
the second member includes a first cam on a first side of the second member and a second cam on a second side of the second member opposite the first side; and
the hinge member includes a plurality of receptacles configured for receiving the first and second cams of each of the first and second members of the protective case, respectively.

19. The removable protective case of claim 18 wherein the cams of the hinge member pivot within the receptacles of the hinge member when the installed foldable electronic device transitions between the closed position and the opened position to move the hinge member in a direction substantially perpendicular to the plane.

20. The removable protective case of claim 18 wherein each of the cams has a curved triangular shape.

* * * * *